(No Model.)
J. C. ANDERSON.
UNICYCLE.
No. 550,400. Patented Nov. 26, 1895.
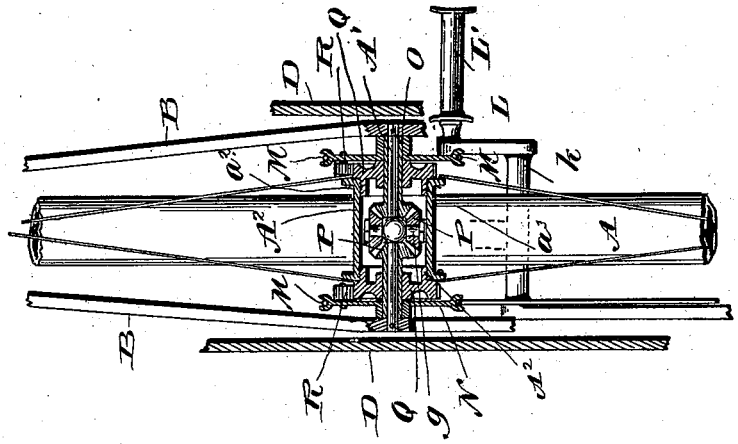
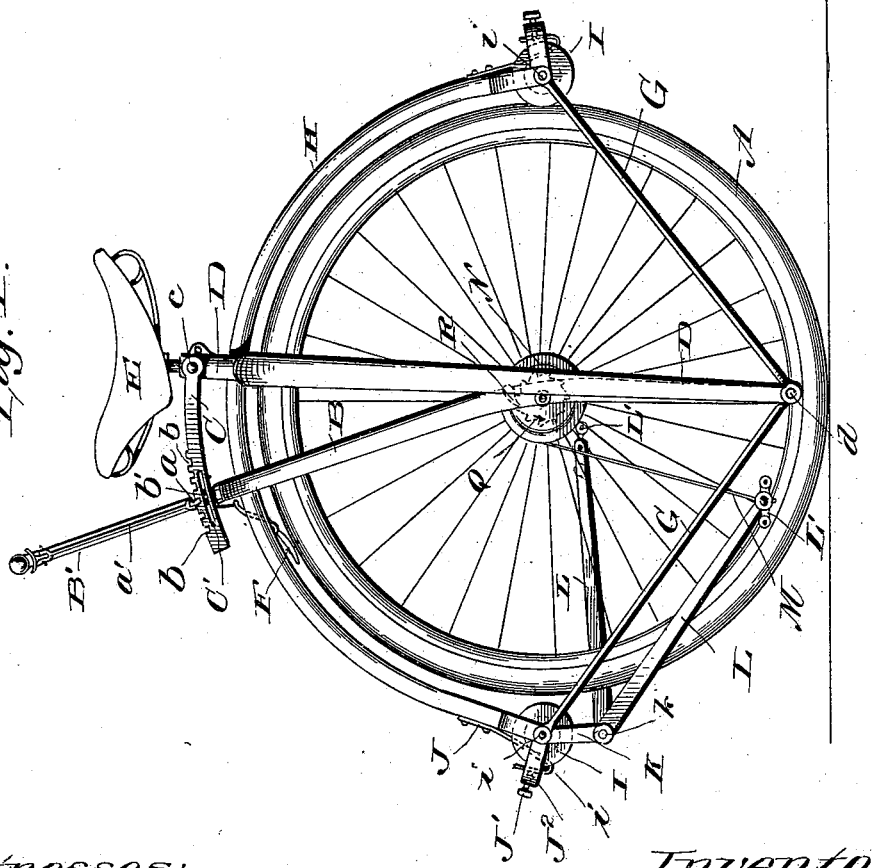
Witnesses:
L. C. Hills.
E. M. Bond
Inventor:
James C. Anderson
by Thomson Jay Hudson,
atty.

UNITED STATES PATENT OFFICE.

JAMES C. ANDERSON, OF HIGHLAND PARK, ILLINOIS.

UNICYCLE.

SPECIFICATION forming part of Letters Patent No. 550,400, dated November 26, 1895.

Application filed December 17, 1894. Serial No. 532,085. (No model.)

*To all whom it may concern:*

Be it known that I, JAMES C. ANDERSON, a citizen of the United States, residing at Highland Park, in the county of Lake and State of Illinois, have invented certain new and useful Improvements in Unicycles; and I do hereby declare the following to be a full, clear, and exact description of the invention, such as will enable others skilled in the art to which it appertains to make and use the same.

This invention pertains to unicycles; and it has for its object, among others, to provide an improved vehicle of this class in which the point of support will be in line with and below the center of the main wheel. I provide an improved safety-wheel and brake having provision for regulating the pressure thereof upon the main wheel in accordance with the weight of the rider and other requirements which will have to be determined by experience. The safety-wheels and brake are under the direct control of the rider from the seat, the tension of the brake-wheel being regulated by means of a spring and set-screw or other analogous means.

Other objects and advantages of the invention will hereinafter appear, and the novel features thereof will be particularly pointed out in the appended claims.

The invention is clearly illustrated in the accompanying drawings, which, with the letters of reference marked thereon, form a part of this specification, and in which—

Figure 1 is a side elevation of my improved unicycle; and Fig. 2 is a detail in vertical section, the section being taken through the center of the hub and portions of the wheel and frame being shown in elevation.

Like letters of reference indicate like parts in both of the views.

Referring now to the details of the drawings by letter, A designates the wheel, having any desired style of tire. A' is the axle of the said wheel, and this axle is mounted in the fork B, the upper end of which embraces the wheel and terminates in a handle or lever B', as seen in Fig. 1. This handle or lever carries a pawl $a$, actuated by means of a rod $a'$ and which pawl is designed to engage the notches $b$ of the curved segment C, which is attached to the upper end of the frame D, as seen in Fig. 1, said segment having a curved slot C', in which is designed to work a pin or projection $b'$ on the handle or lever B', all as clearly shown in Fig. 1.

E is the seat or saddle of any desired construction and mounted upon the upper end of the frame D in any suitable manner.

The frame D embraces the wheel, as seen in both views, and its lower ends or portion extend substantially vertical in line with the axle of the wheel and terminate at a point in close proximity with the lower periphery of said wheel, as seen in Fig. 1. The fork B is also extended, as shown, and the said fork and frame are pivotally connected, as shown at $d$.

F is a brake mounted to act upon the periphery of the main wheel, and is designed to be actuated in the usual manner by suitable connections on the handle-bar.

G are brace arms or rods extending from the frame upward in opposite directions from the point $d$ where the frame and fork unite, the outer ends of said brace arms or rods being connected with opposite ends of the bowed or arched piece H, which is supported from the upper end of the frame and which is more or less resilient. The ends of this arched or bowed piece H are bifurcated, and between the bifurcations work the groove-wheels I, which are mounted to turn more or less loosely upon the axles $i$, held in the bifurcated ends of the piece H and in the outer ends of the brace-rods G, as seen clearly in Fig. 1. These grooved wheels are designed to be thrown into engagement with the periphery of the main wheel whenever necessary to prevent the rider from being thrown over by reason of the wheel assuming a position which would tend to throw the center of gravity out of line and thus capsize the rider, this being governed by the manipulation of the lever B'. The braces G being connected with the fork B at the point $d$, manipulation of the lever B' will cause the resilient piece H to be thrown with one end or the other toward the wheel A, and consequently bring one of the grooved wheels I into contact therewith.

Upon the front wheel I is arranged to bear a spring J, one end of which is secured to the bowed piece H near its end, the other end of said spring being bent upon itself, as seen at $i'$ and arranged to bear within the groove and against the periphery of the wheel I. The tension or pressure of this spring upon the wheel may be adjusted by means of a set-screw J' or other similar device mounted in the stirrup J², supported from the piece H or from the brace-arms G, as seen in Fig. 1, the said set-screw bearing upon the upturned end of the spring, as seen in said Fig. 1. If desired, or if at any time for any reason it should be necessary to regulate the tension of the rear wheel, a similar device may be applied thereto, as indicated in Fig. 1; but ordinarily this rear wheel will require to rotate freely and the spring and its regulating device will not be present. By tightening the screw the pressure upon the wheel is increased and it will rotate less freely and hence provide greater friction when the said wheel is brought into contact with the periphery of the main wheel A.

From the front end of the bowed piece H there depends a bracket K, in the lower end of which is supported the transverse pin or shaft $k$, upon opposite sides of which are mounted the treadles L, the free ends of which carry the pedals L', as shown, and to the free ends of these treadles or pedal-arms L are attached the cords, straps, or chains M, the opposite ends of which pass over and are secured to the grooved wheels or disks N, which are loose upon the sleeve O, which sleeve forms or constitutes the hub of a miter-gear P, which is mounted to revolve about the axle A' of the main wheel, as seen in Fig. 2.

The hub A² of the wheel A is flanged, as usual, for the attachment of the inner ends of the spokes, and at its ends is internally threaded, as shown at $a^2$, to receive the threaded hubs $a^3$ of the ratchet-wheels Q, as seen in said Fig. 2, and which ratchet-wheels are fast upon the hubs of the miter-gears P, as shown in Fig. 2. R are pawls pivotally mounted upon the inner faces of the grooved wheels or disks N and adapted to engage the ratchet-wheels Q, as seen in both views. S are idler miter-gears arranged within the hub and between the miter-gears P, as seen in Fig. 2. It will thus be seen that the hub serves to inclose the gearing to prevent the same from becoming clogged with dust and dirt and avoids the necessity for an additional casing therefor, thus effecting a material saving in the weight and cost of the machine.

With the parts constructed and arranged substantially as hereinbefore set forth the operation will be apparent and is briefly stated as follows: When pressure is applied by the foot upon one of the pedals, the same is forced downward in the direction of the arrow in Fig. 1. The pawl R on the grooved wheel or disk around which the strap of said treadle is passed engaging in the teeth of the ratchet-wheel moves the same in the direction of the arrow in Fig. 1, and this ratchet-wheel being fast upon the hub of the wheel necessarily imparts motion to the latter. As pressure is removed from this treadle and applied to the other and the latter moved downward, the miter-gear upon the side of the wheel whose treadle is moving downward is revolved and through the intervention of the idler miter-gears imparts to the miter-gear upon the opposite side a motion in the opposite direction, which causes the strap connected with the treadle which has just previously been forced downward to be wound up, and at each depression of the treadle the strap upon the opposite side is wound upon its disk, the operation being similar to that of the old "Star" movement, but the construction differing in the details hereinbefore specified. The lever B' is manipulated by the rider to keep the wheel in an upright position, throwing the safety-wheel and brake I against the periphery of the larger wheel when necessary and holding the parts at the proper angle with relation to each other by manipulation of said lever B', and, if desired, holding the parts in such relative position by engagement of the pawl in the notched segment.

The additional weight obtained by the extension of the frame below the axle lowers the center of gravity, thus materially increasing the safety of the rider.

It is deemed important that the fork and frame be pivotally united at a point below and in substantial vertical line with the axis of the main wheel, and that this point be extended as near the lower periphery of the wheel as possible, whereby the two parts B and D are free to move independent of or with relation to each other, so that the rider may assist in acquiring and keeping his equilibrium merely by the necessary movements of his body, throwing his weight forward or backward as occasion may require.

The treadles being pivoted to the arch H near the periphery of the main wheel at a point forward of the axis of the wheel and the frame pivotally connected to the fork at the point $d$ below said axis, as the body is thrown forward or backward the center of gravity of the rider is now on one side and now on the other of a vertical line passing through the axle. When falling backward, the rider, in order to recover his balance, rises from the seat, throwing his body forward at the same time, thus bringing his center of gravity in front of the axle and giving to the frame a tendency to rotate in the opposite direction to that in which it was rotating when the rider was falling backward, and so tending to recover his balance. I have found that in order to secure this balancing effect the arrangement of the pedal-levers, as shown and described, is the most efficient. By thus changing the angle of gravity-thrust the rider uses the pedals in unison with the other articulations of the machine and with the articulations of the body to maintain his equilibrium. The generic idea of providing the point of articulation below the axle of the main wheel by pivotally uniting the frame and fork at a point below and in substantially vertical line with the axis of the wheel and near the ground forms the subject-matter and claims of a separate application for Letters Patent filed of even date herewith, Serial No. 532,083, and is therefore not claimed in that regard in this application.

Modifications in detail may be resorted to without departing from the spirit of the invention or sacrificing any of its advantages.

What I claim as new is—

1. The combination with a unicycle frame provided with a seat having its fork provided with handles and pivotally connected with the frame below the center of the wheel, of an arched piece connected with the frame practically in vertical line with such connection, and safety wheels carried one at each end of said arched piece adjacent to and adapted to engage the wheel, substantially as described.

2. The combination with a unicycle frame provided with a seat and the fork provided with handles and supporting the axle of the main wheel and pivotally connected with the frame below the said axle and substantially in vertical line therewith, and a safety wheel supporting device arranged adjacent to and substantially concentric with the main wheel and connected with the frame above the axle and connected with the frame and fork at their point of juncture, as set forth.

3. The combination with a unicycle frame provided with a seat and the fork provided with handles and pivotally connected with the frame at a point below and in substantially vertical line with the axle of the main wheel, of an arched piece arranged concentric with the main wheel, and safety wheels arranged adjacent to the main wheel and adapted to engage the same carried by the ends of said arched piece and provided each with a tension device, substantially as described.

4. The combination with a unicycle frame provided with a seat and the fork provided with handles and pivotally connected with the frame at a point below and in substantially vertical line with the axle of the main wheel, of an arched piece arranged concentric with the main wheel, and safety wheels arranged adjacent to the main wheel and adapted to engage the same carried by the ends of said arched piece and provided each with a tension device, and means for adjusting said device to regulate the tension or pressure of the said wheels, substantially as described.

5. The combination with the main wheel, the frame provided with a seat and the fork provided with handles and pivotally connected with said frame below and in vertical line with the axle of the wheel, of an arched piece mounted on the frame and carrying grooved wheels at its ends, said wheels arranged adjacent to the main wheel and adapted to engage the same, and rods connecting the ends of said arched piece with the lower extremity of the frame, substantially as described.

6. The combination with the main wheel, the frame provided with a seat and the fork provided with handles and pivotally connected with the frame at a point below and substantially in vertical line with the axle of the main wheel, of the arched piece supported concentric with the main wheel and in close proximity thereto, the brace rods connecting the ends of the arched piece with the point of connection of the frame and fork, grooved wheels mounted in the ends of the arched piece, and springs bearing upon said grooved wheels and provided with adjusting means, substantially as described.

7. The combination with the main wheel, the frame provided with a seat and the fork provided with handles and pivotally connected with the frame at a point below and in vertical line with the axis of the main wheel, of the arched piece concentric with the main wheel and in close proximity thereto, the brace rods connecting the ends of the arched piece with the point of connection between the fork and frame, the bracket depending from the front end of said arched piece, and the treadles mounted at their outer ends upon said bracket and extending toward the central vertical line of the machine, substantially as described.

In testimony whereof I affix my signature in presence of two witnesses.

JAMES C. ANDERSON.

Witnesses:
HEATH SUTHERLAND,
GEORGE W. COX, Jr.